(12) United States Patent
Choi

(10) Patent No.: US 11,955,110 B2
(45) Date of Patent: Apr. 9, 2024

(54) IDENTIFYING LANGUAGE IN MUSIC

(71) Applicant: LEMON INC., Grand Cayman (KY)

(72) Inventor: Keunwoo Choi, Los Angeles, CA (US)

(73) Assignee: LEMON, INC., Grand Cayman (KY)

( * ) Notice: Subject to any disclaimer, the term of this patent is extended or adjusted under 35 U.S.C. 154(b) by 261 days.

(21) Appl. No.: 17/186,490

(22) Filed: Feb. 26, 2021

(65) Prior Publication Data
US 2022/0277729 A1    Sep. 1, 2022

(51) Int. Cl.
| | | |
|---|---|---|
| G10L 15/00 | (2013.01) | |
| G06F 16/68 | (2019.01) | |
| G06F 40/263 | (2020.01) | |
| G06N 5/04 | (2023.01) | |
| G06N 20/00 | (2019.01) | |
| G10L 15/06 | (2013.01) | |
| G10L 15/22 | (2006.01) | |
| G10L 21/14 | (2013.01) | |
| G10L 25/18 | (2013.01) | |
| G10L 25/81 | (2013.01) | |

(52) U.S. Cl.
CPC .......... *G10L 15/005* (2013.01); *G06F 16/686* (2019.01); *G06F 40/263* (2020.01); *G06N 5/04* (2013.01); *G06N 20/00* (2019.01); *G10L 15/063* (2013.01); *G10L 15/22* (2013.01); *G10L 21/14* (2013.01); *G10L 25/18* (2013.01); *G10L 25/81* (2013.01)

(58) Field of Classification Search
CPC .................................................... G06F 40/263
See application file for complete search history.

(56) References Cited

U.S. PATENT DOCUMENTS

| | | | | |
|---|---|---|---|---|
| 2017/0300976 | A1* | 10/2017 | Dogruöz | G06Q 50/01 |
| 2018/0342239 | A1* | 11/2018 | Baughman | G10L 15/005 |
| 2020/0007946 | A1* | 1/2020 | Olkha | G06F 40/263 |

(Continued)

FOREIGN PATENT DOCUMENTS

CN    110838286 A    2/2020

OTHER PUBLICATIONS

Chandrasekhar, Vijay, Mehmet Emre Sargin, and David A. Ross. "Automatic language identification in music videos with low level audio and visual features." 2011 IEEE international conference on acoustics, speech and signal processing (ICASSP). IEEE, 2011. (Year: 2011).*

(Continued)

*Primary Examiner* — Douglas Godbold
(74) *Attorney, Agent, or Firm* — BakerHostetler

(57) ABSTRACT

The present disclosure describes techniques for identifying languages associated with music. Training data may be received, wherein the training data comprise information indicative of audio data representative of a plurality of music samples and metadata associated with the plurality of music samples. The training data further comprises information indicating a language corresponding to each of the plurality of music samples. A machine learning model may be trained to identify a language associated with a piece of music by applying the training data to the machine model until the model reaches a predetermined recognition accuracy. A language associated with the piece of music may be determined using the trained machine learning model.

17 Claims, 10 Drawing Sheets

(56) References Cited

U.S. PATENT DOCUMENTS

2020/0380215 A1* 12/2020 Kannan .................. G06F 40/40
2021/0350790 A1* 11/2021 Maystre ................. G10L 25/00

OTHER PUBLICATIONS

Lozano-Diez, Alicia, et al. "An end-to-end approach to language identification in short utterances using convolutional neural networks." Sixteenth Annual Conference of the International Speech Communication Association. 2015. (Year: 2015).*

Montalvo, Ana, Yandre MG Costa, and José Ramón Calvo. "Language identification using spectrogram texture." Progress in Pattern Recognition, Image Analysis, Computer Vision, and Applications: 20th Iberoamerican Congress, CIARP 2015, Montevideo, Uruguay, Nov. 9-12, 2015 (Year: 2015).*

International Patent Application No. PCT/SG2022/050093; Int'l Search Report; dated May 23, 2022; 4 pages.

Kruspe; "Improvising Singing Language Identification Through I-Vector Extraction"; Proc. Of the 17$^{th}$ Int'l Conf. on Digital Audio Effects (DAFx-14); Sep. 2014; 7 pages.

Choi et al.; "Listen, Read, and Identify: Multimodal Singing Language Identification of Music"; ISMIR Sound; arXiv:2103.01893; Mar. 2021; 7 pages.

Kruspe; "Phonotactic language identification for singing"; Interspeech; Sep. 2016; p. 3319-3323.

Linus Roxbergh; "Language Classification of Music Using Metadata"; Uppsala Universitet; UPTEC STS 19007; Mar. 2019; 62 pages (contains English Abstract).

Daniel Del Castillo; "End-to-end Learning for Singing-Language Identification"; KTH Royal Institute of Technology; Degree Project in Computer Science and Engineering, Second Cycle, 30 Credits; May 2020; 56 pages (contains English Abstract).

* cited by examiner

500

```
>>> long_detect_wrapper('foie gras')
array([[0.2857138 , 0.        , 0.        , 0.        , 0.        ,
        0.        , 0.        , 0.        , 0.        , 0.        ,
        0.        , 0.        , 0.        , 0.        , 0.        ,
        0.        , 0.        , 0.        , 0.        , 0.        ,
        0.        , 0.        , 0.        , 0.        , 0.        ,
        0.        , 0.        , 0.        , 0.        , 0.        ,
        0.        , 0.71428275, 0.        , 0.        , 0.        ,
        0.        , 0.        , 0.        , 0.        , 0.        ,
        0.        , 0.        , 0.        , 0.        , 0.        ,
        0.        ,           ], dtype=float32)
```

```
>>> long_detect_wrapper('this is another example')
array([[0.        , 0.        , 0.        , 0.        , 0.        ,
        0.        , 0.        , 0.        , 0.        , 0.        ,
        0.99999624, 0.        , 0.        , 0.        , 0.        ,
        0.        , 0.        , 0.        , 0.        , 0.        ,
        0.        , 0.        , 0.        , 0.        , 0.        ,
        0.        , 0.        , 0.        , 0.        , 0.        ,
        0.        , 0.        , 0.        , 0.        , 0.        ,
        0.        , 0.        , 0.        , 0.        , 0.        ,
        0.        , 0.        , 0.        , 0.        , 0.        ,
        0.        ,           ], dtype=float32)
```

| Text input | Precision | Recall | F1-Score |
|---|---|---|---|
| Artist Name | .323 | .221 | .149 |
| Album Name | .399 | .378 | .284 |
| Track Title | .450 | .444 | .317 |
| Joining All | .510 | .569 | .429 |

FIG. 6

IDENTIFYING LANGUAGE IN MUSIC

BACKGROUND

Typical language identification techniques determine a language associated with speech. However, the techniques used for identifying language in speech do not work for identifying language in music. For example, the techniques used for identifying language in speech may not work for identifying language in music due to the difference between speech utterance and singing. Therefore, improvements in language identification techniques are needed.

BRIEF DESCRIPTION OF THE DRAWINGS

The accompanying drawings, which are incorporated in and constitute a part of this specification, illustrate embodiments and together with the description, serve to explain the principles of the methods and systems:

FIGS. 5a-b illustrates example language probability vectors associated with metadata.

FIG. 6 illustrates example table depicting the performance of a language identification model.

DETAILED DESCRIPTION OF ILLUSTRATIVE EMBODIMENTS

Identifying language in music, e.g., singing language identification (SLID), is a classification task that involves identifying one or more languages associated with music. For example, SLID may involve identifying one or more languages used in the lyrics of music, and/or one or more languages associated with the instruments used in music. A listener's ability to understand the language used in the lyrics of a piece of music and/or to culturally identify instruments used in the piece of music plays a crucial role in the music-listening experience. Accordingly, being able to identify language information associated with music is essential for music discovery and music recommendation systems. However, despite the importance of being able to identify language information associated with music, such language information is not always available. For example, one or more of the geographic region(s) associated with a piece of music, lyrical information associated with a piece of music, and/or language(s) associated with a piece of music may not be available. This lack of language information is a problem even for some of the most large-scale and established music consumption chains and/or music-streaming services.

To address this problem, SLID models have been developed that aim to identify language within music. Some of these SLID models utilize traditional machine learning classifiers and features associated with the audio content of music to recognize language within the music. Others of these SLID models depend on modalities other than audio content. For example, one SLID model classifies music videos into language categories by taking visual features of the video along with basic audio features. As another example, one SLID model identifies language within music using track title and album name. Additionally, these existing SLID models aim to identify language within music using only a portion of the music data—some use solely audio content, others use audio content and visual features of a music video, and others use track title and album name. Because these existing SLID models use only a portion of the music data, they are not able to identify language within music with a high accuracy rate. Accordingly, it may be desirable develop techniques for producing a more accurate SLID model.

Figure 1:
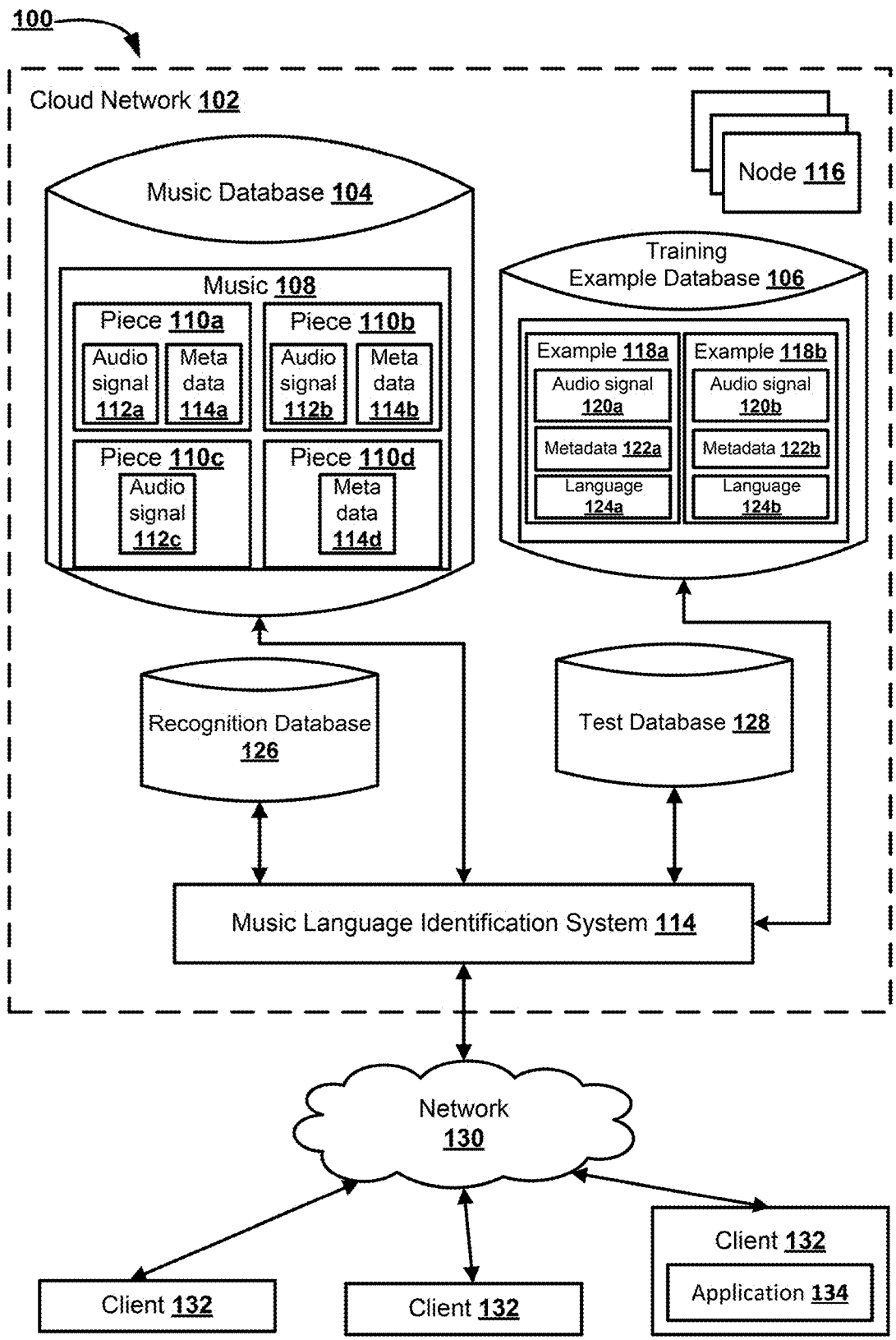
FIG. 1 is a schematic diagram illustrating an example system for use in accordance with the present disclosure.

An improved SLID model may use both audio content and textual metadata to identify language associated with music. Audio content and textual metadata are two of the most prevailing forms of available music data. By using a greater portion of prevailing music data, the improved SLID model is able to identify language associated with music with a higher accuracy than existing SLID models that identify language within music using only a portion of music data. FIG. 1 illustrates an example environment 100 in which the systems and methods described herein may be implemented. Environment 100 includes a cloud network 102 and at least one client device 132. Cloud network 102 and client device 132 are in communication via one or more networks 130. The improved SLID model may be comprised in either the client device 132 or a music language identification system 114 hosted by the cloud network 102.

It should be appreciated that FIG. 1 is merely illustrative and that other implementations might be utilized. For instance, the client device 132, the music language identification system 114, or other computing devices may be used singly or in combination to implement techniques of identifying languages for music as described in the present disclosure. It should also be appreciated that network topology illustrated in FIG. 1 has been greatly simplified and that many more networks, devices, and databases may be utilized to interconnect various computing systems.

Cloud network 102 may be located at a data center, such as a single premise, or be distributed throughout different geographic locations (e.g., at several premises). Cloud network 102 may provide services via the one or more networks 130. Network 130 may comprise one or more public networks (e.g., the Internet) and/or one or more private networks. A private network may include a wireless local area network (WLAN), a local area network (LAN), a wide area network (WAN), a cellular network, or an intranet. Network 130 may comprise wired network(s) and/or wireless network(s). For example, network 130 may comprise physical links, such as coaxial cable links, twisted pair cable links, fiber optic links, a combination thereof, and/or the like. As another example, network 130 may comprise wireless links, such as cellular links, satellite links, Wi-Fi links and/or the like. Network 130 may comprise a variety of network devices, such as routers, switches, multiplexers, hubs, modems, bridges, repeaters, firewalls, proxy devices, and/or the like.

The cloud network 102 may comprise a plurality of computing nodes 116 that host a variety of services. In an embodiment, the nodes 116 host a music language identification system 114. The nodes 116 may process tasks associated with the music language identification system 114. The plurality of computing nodes 116 may be implemented as one or more computing devices, one or more processors, one or more virtual computing instances, a combination thereof, and/or the like. The plurality of computing nodes 116 may be implemented by one or more computing devices. The one or more computing devices may comprise virtualized computing instances. The virtualized computing instances may comprise a virtual machine, such as an emulation of a computer system, operating system, server, and/or the like. A virtual machine may be loaded by a computing device based on a virtual image and/or other data defining specific software (e.g., operating systems, specialized applications, servers) for emulation. Different virtual machines may be loaded and/or terminated on the one or more computing devices as the demand for different types of processing services changes. A hypervisor may be implemented to manage the use of different virtual machines on the same computing device.

Music language identification system 114 may implement a number of the functions and techniques described herein. For example, music language identification system 114 may be configured to identify one or more languages associated with music. Music language identification system 114 may be associated with an entity, such as a music discovery or music recommendation platform, seeking to identify language(s) associated with music. In an embodiment, music language identification system 114 comprises an SLID model that is trained to identify one or more languages associated with music. For example, music language identification system 114 may comprise an SLID model that is trained to identify one or more languages associated with music using both audio content and textual metadata.

In an embodiment, music language identification system 114 trains the SLID model to identify one or more languages associated with music. Music language identification system 114 may train the SLID model using training examples. The training examples used to train the SLID model may be generated in a variety of different ways. For example, the training examples may be manually generated using manual data entry. The training examples may additionally, or alternatively, be generated automatically using a computer. The training examples used to train the SLID model may comprise either positive training examples or a combination of positive training examples and negative training examples. The number of training examples used to train the SLID model may vary, but in an embodiment, over 100,000 training examples are used to train the SLID model.

The training examples may indicate one or more languages associated with a plurality of different music samples. The one or more languages associated with a particular music sample may indicate one or more languages used in the lyrics of the music sample. For example, if a music sample features a woman singing in French and a man rapping in English, that music sample may be associated with both the French and English languages. Additionally, or alternatively, the one or more languages associated with a particular music sample may indicate a language commonly spoken in a geographic region associated with some other feature of the music sample. For example, if a particular instrument used in a music sample is native to Mexico, the one or more languages associated with that music sample may include Spanish regardless of whether the lyrics of that song are in Spanish. In an embodiment, each the training examples may be classified into one or more of a plurality of different languages. For example, there may be various language labels in the dataset, including, but not limited to, English, Portuguese, Spanish, Korean, French, Japanese, German, Polish, Italian, Slovakian, and others.

Each of the music samples may be an entire song or may be a portion of a song, such as a 30-second portion of a song. Each of the music samples may be associated with audio data (i.e. an audio clip) and/or metadata. If a music sample is associated with audio data, the audio data may include a vocal track from the music sample and/or an instrumental track from the music sample. The vocal track may include the lyrics of the music sample, and the instrumental track may include the audio track of the music sample without any vocals. If a music sample is associated with metadata, the metadata may indicate any information that exists and is easily accessible for a majority of music tracks, such as song title, album name, artist name, and/or an identification number. Data such as song title, album name, and artist name are easily accessible as they are usually included on online music streaming services. While other types of data, such as visual features of music videos and/or pre-computed track vectors may be useful for determining a language associated with a music sample, these other types of data are of limited availability—even for those in the music industry who have access to a large-scale proprietary catalogue. Accordingly, a SLID model trained on these other types of data is impractical and difficult-to-reproduce.

In an embodiment, all of training examples comprise audio data and metadata. In another embodiment, a majority of training examples comprise audio data and metadata while some training examples comprise either audio data or metadata. For instance, the training examples account for the fact that, in application, data about a particular music sample may be missing. Once trained, the SLID model may be used to recognize one or more languages associated with a music sample that is missing either audio data or metadata. Accordingly, it is desirable to train the SLID model in such a way that it is still able to recognize one or more languages associated with a music sample that is missing either audio data or metadata. To train the SLID model in this way, a technique called Dropout may be used. In a dropout module, the audio data of a certain percentage of the music samples used in the training examples, such as 5%, 10%, 30% or any other percentage of music samples, may be "dropped out." Similarly, the metadata of a certain percentage of the music samples used in the training examples may be "dropped out." This means that out of the entire set of training examples, a certain percentage of training examples would have a zero value for the audio data, and a certain percentage of training examples would have a zero value for the metadata. The training examples that have a zero value for audio data may be associated with different music samples, such as training examples that have a zero value for metadata. A certain percentage of the training examples, such as a majority of the training examples, may have not had a zero value for either the audio data or the metadata (i.e. neither the audio data nor the metadata was "dropped out" for those music samples). In this way, missing modality cases may be simulated while training the SLID model. As a result, a single SLID model can be used to recognize language within music even if there is a missing modality of a particular piece of music.

As an illustrative example, to train the SLID model, music language identification system 114 may receive as input, from a training example database 106, training examples 118a-b. It should be appreciated that training example database 106 may comprise thousands even millions of training examples. Training examples 118a-b are merely for illustrative purpose. Training examples 118a-b may include information indicative of audio data representative of a plurality of music samples. Training examples 118a-b may additionally, or alternatively, include metadata associated with the plurality of music samples. Training examples 118a-b may additionally include information that indicates at least one language that corresponds to each of the plurality of music samples. As discussed above, a portion of training examples 118a-b may have a zero value for the audio data, and/or a portion of training examples 118a-b may have a zero value for the metadata.

For example, training example 118a may include an audio signal 120a and/or metadata 122a, and at least one language 124a. Audio signal 120a may include an audio signal associated with a first music sample. Audio signal 120a may include a vocal track and/or an instrumental track associated with the first music sample. Metadata 112a may indicate information associated with the first music sample, such as song title, album name, artist name, and/or an identification number. Language 124a may indicate one or more languages associated with the first music sample. Language 124a may have been identified manually, such as by an individual that listened to the first music sample. For example, the individual may have listened to the first music sample and recognized that English and Spanish were both associated with either the lyrics and/or the instruments used in the first music sample. The individual may then label language 124a as English and Spanish. Similarly, training example 118b may include an audio signal 120b and/or metadata 122b, and at least one language 124b. Audio signal 120b may include an audio signal associated with a second music sample. Audio signal 120b may include a vocal track and/or an instrumental track associated with the second music sample. Metadata 112b may indicate information associated with the second music sample, such as song title, album name, artist name, and/or an identification number. Language 124b may indicate one or more languages associated with the second music sample. Language 124b may have been identified manually, such as by an individual that listened to the second music sample.

Training examples 118a-b may be used by music language identification system 114 to train the SLID model. To train the SLID model using training examples 118a-b, music language identification system 114 may input training examples 118a-b and pair the input audio data and input metadata with the expected output (i.e. the language(s) that have already been associated with the music samples). By pairing the input audio data and metadata with the known languages in the respective music samples and using these pairs to train the SLID model, the SLID model may learn to associate particular features of audio data and/or metadata with different languages. The SLID model may need to be trained on a large number of training examples before it has learned enough to make accurate language recognition. The desired recognition accuracy level may be determined by the entity or individual training the SLID model, and the SLID model may continue to be trained until it has learned enough to make language recognition with the desired level of accuracy.

To determine if the SLID model is making language recognition with the desired level of accuracy, the SLID model may be tested. The SLID model may be tested using testing data. To test the SLID model, test data may be input to the SLID model, and the output of the SLID model may be compared to an expected result. The test data may be a set of examples used to assess the performance of the trained SLID model.

The test data, or test examples, that are input to the SLID model may be similar to the data used to train the SLID model. For example, one test example may include audio data and metadata associated with a music sample. While the test example also includes one or more languages associated with that music sample, the one or more languages are not input into the SLID model. Rather, the audio data and/or metadata associated with the music sample may be input to the SLID model to see which language(s) the SLID model identifies are associated with the music sample. This recognition may be compared to the one or more languages associated with the music sample as indicated by the test example (i.e. the expected result). If a certain percentage of the recognition results using the test data do not match their respective expected results, the SLID model may need to be trained on more and/or a greater variety of training examples. This process of training and testing may be repeated over and over again until the SLID model is recognizing languages at the desired level of accuracy.

Figure 2:
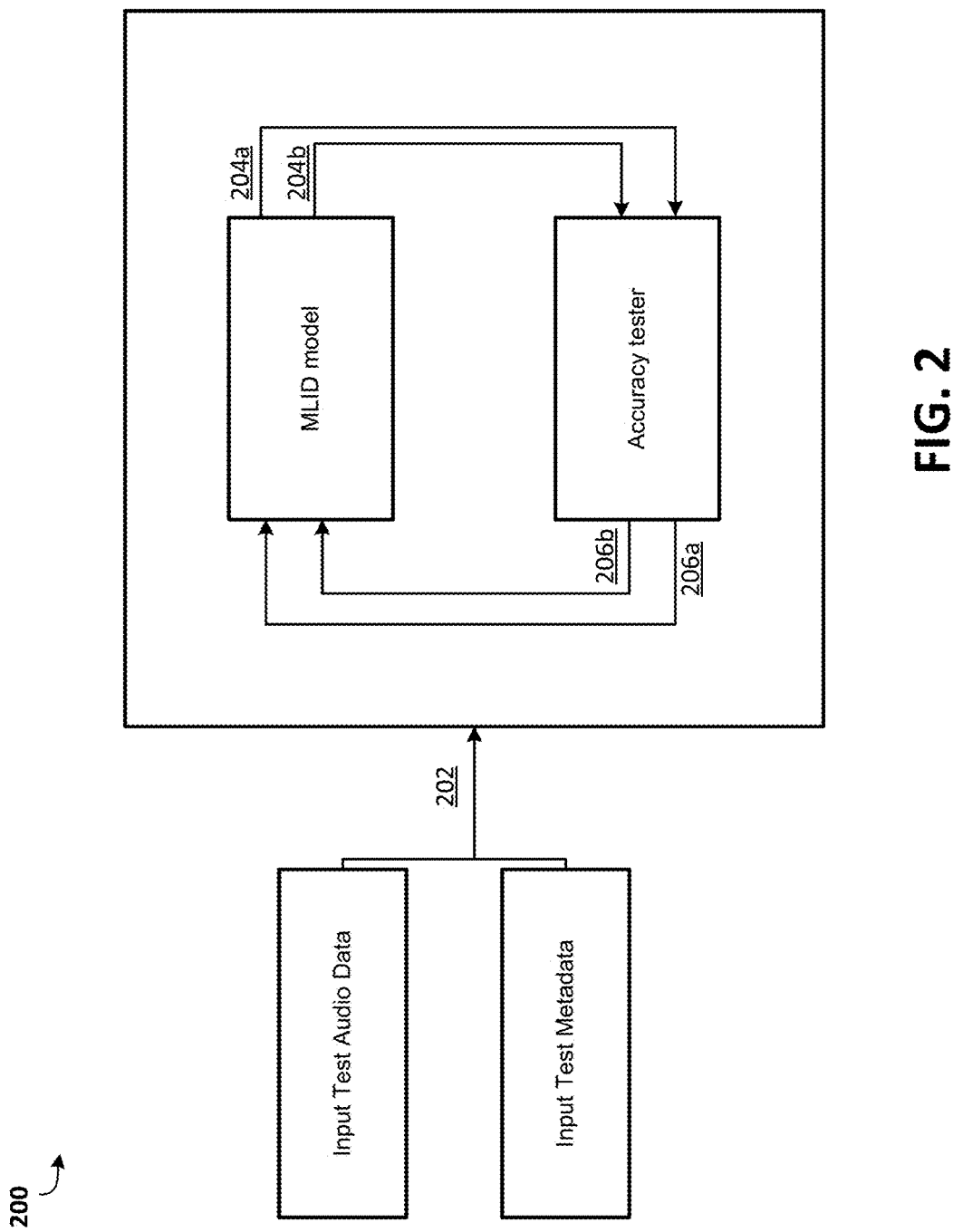
FIG. 2 illustrates an example process for testing a language identification model that may be used in accordance with the present disclosure.

FIG. 2 illustrates an example process 200 for testing a SLID model that is going to be used to identify one or more languages associated with music. The process 200 may be performed, for example, by music language identification system 114. Input may be received, such as from a test database 128. The input may include test examples. The test examples may include information indicative of audio data representative of a plurality of music samples. The test data may also include metadata associated with the plurality of music samples. In one example, the set of test data for testing a SLID are different from the set of training data used to train the SLID. The test data may include information that indicates at least one language that corresponds to each of the plurality of music samples and is used to compare with the output of the SLID. As discussed above with respect to the training examples, a portion of the test examples may have a zero value for the audio data, and/or a portion of the test examples may have a zero value for the metadata.

For example, a test example may include an audio signal and metadata, and at least one language. The audio signal may include an audio signal associated with a music sample. The audio signal may include a vocal track and/or an instrumental track associated with that music sample. The metadata may indicate information associated with the music sample, such as song title, album name, artist name, and/or an identification number. The language may indicate one or more languages associated with the music sample. The language may have been identified manually, such as by an individual that listened to the music sample. For example, the individual may have listened to the music sample and recognized that French and Portuguese were both associated with either the lyrics and/or the instruments used in the music sample. The individual may then label the languages as French and Portuguese.

At 202, to test the SLID model using test examples, the audio signal and/or metadata of the test examples may be input to the SLID model. At 204a, the SLID model may output recognized languages associated with the input audio signal and/or metadata. These one or more recognized languages may be compared to the corresponding expected languages, as indicated by the test example. If the output matches the corresponding expected languages, the SLID model has produced accurate recognition. If the output does not match, or only partially matches, the expected languages, the SLID has not produced accurate recognition. At 206a, the accuracy of the recognition may be output, such as by an accuracy tester. The accuracy of the recognition may be compared to a desired level of accuracy. If the accuracy is below the desired level of accuracy, the SLID model may need to be trained on more training examples and/or a greater variety of training examples to improve the level of accuracy until it reaches the desired level of accuracy.

After training the SLID model on more and/or different training examples, returning to 202, audio data and/or metadata of different test examples may be input to the SLID model. At 204b, the SLID model may output recognized languages associated with the new input audio signal and/or metadata. These recognized languages may be compared to the expected languages, as indicated by the new test examples. If the output matches the expected languages, the SLID model has produced accurate recognition. If the output does not match, or only partially matches, the expected languages, the SLID has not produced accurate recognition. At 206b, the accuracy of the recognition may be output, such as by an accuracy tester. Again, the accuracy of the recognition may be compared to a desired level of accuracy. If the accuracy is still below the desired level of accuracy, the SLID model may need to be trained on more training examples and/or a greater variety of training examples to keep improving the level of accuracy until it reaches the desired level of accuracy. The process 200 may be repeated over and over again until the SLID model is producing results at the desired level of accuracy. The SLID model may be periodically trained to maintain the desired level of accuracy. The results of the testing process may be output and stored in a database, such as test database 128.

Referring back to FIG. 1, in another embodiment, the SLID model is trained and/or tested by a system that is not music language identification system 114. For example, if music language identification system 114 is associated with an entity, such as a music discovery or music recommendation platform, seeking to identify language(s) associated with music, the SLID model may be trained and/or tested by a different entity. After the SLID model is trained and/or tested by the different entity, the trained and tested SLID model may be used by that different entity and/or by the entity, such as a music discovery or music recommendation platform, seeking to identify language(s) associated with music. The different entity may train and/or test the SLID model in a manner similar to that described above with respect to FIG. 2.

Once trained and tested, the SLID model may be used to identify one or more languages associated with music. In an embodiment, music language identification system 114 uses the SLID model to recognize one or more languages associated with music. To recognize one or more languages associated with music, music language identification system 114 may receive as input, from a music database 104, music 108. The music 108 may include a plurality of pieces of music, such as music pieces 110a-d. Each music piece 110a-d may be an entire song or may be a portion of a song, such as a 30-second portion of a song.

Each music piece 110a-d may be associated with audio data (i.e. an audio clip) and/or metadata. If a music piece 110a-d is associated with audio data, the audio data may include a vocal track from the music sample and/or an instrumental track from the music sample. The vocal track may include the lyrics of the music sample, and the instrumental track may include the audio track of the music sample without any vocals. If a music piece 110a-d is associated with metadata, the metadata may indicate any information about the music piece such as song title, album name, artist name, and/or an identification number.

To recognize one or more languages associated with a piece of music, music language identification system 114 may input the audio data and metadata associated with that piece of music to the SLID model. For example, to recognize one or more languages associated with music piece 110a, music language identification system 114 may input audio data 112a and metadata 114a associated with music piece 110a. The SLID model may use audio data 112a and metadata 114a to predict one or more languages associated with music piece 110a. The recognition of one or more languages associated with music piece 110a may be stored in a database, such as in a recognition database 126. As another example, to recognize one or more languages associated with music piece 110b, music language identification system 114 may input audio data 112b and metadata 114b associated with music piece 110b. The SLID model may use audio data 112b and metadata 114b to recognize one or more languages associated with music piece 110b. The recognition of one or more languages associated with music piece 110b may be stored in a database, such as in recognition database 126.

Figure 3:
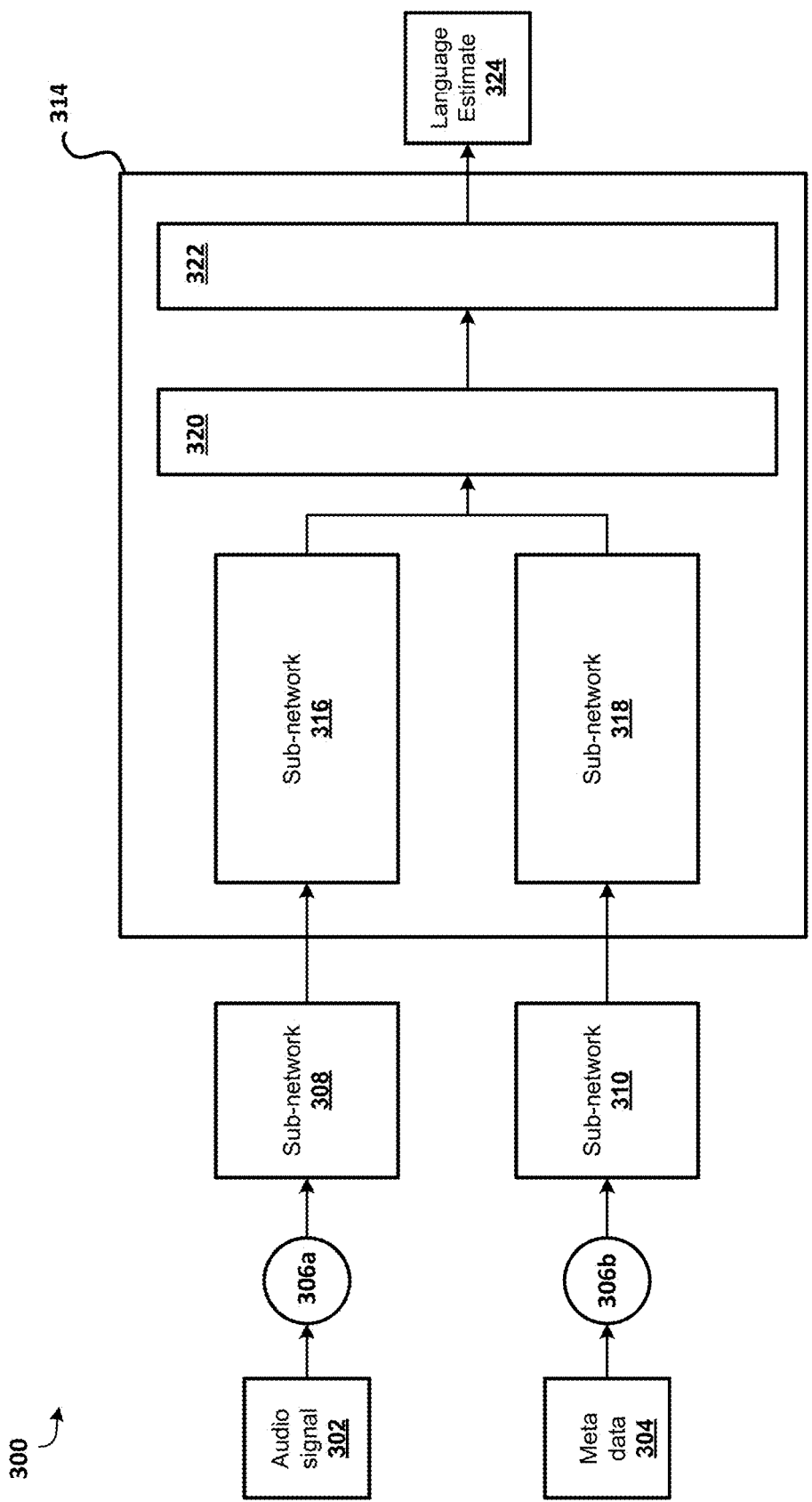
FIG. 3. illustrates an example process for applying a language identification model that may be used in accordance with the present disclosure.

As discussed above, the SLID model may be trained to recognize one or more languages associated with a piece of music even if there is a missing modality of that particular piece of music. For example, a piece of music may not be associated with either audio data or metadata. The SLID model may still be able to recognize one or more languages associated with that piece of music. For example, music piece 110c is associated with audio data 112c. However, music piece 110c does not have any associated metadata. To recognize one or more languages associated with music piece 110c, music language identification system 114 may input audio data 112c. The SLID model may use audio data 112c recognize one or more languages associated with music piece 110c. The recognition of one or more languages associated with music piece 110c may be stored in a database, such as in recognition database 126. As another example, music piece 110d is associated with metadata 114d. However, music piece 110d does not have any associated audio signal. To recognize one or more languages associated with music piece 110d, music language identification system 114 may input metadata 114d. The SLID model may use metadata 114d to recognize one or more languages associated with music piece 110d. The recognition of one or more languages associated with music piece 110d may be stored in a database, such as in recognition database 126. FIG. 3, discussed in detail below, illustrates an exemplary SLID model used to recognize one or more languages associated with music.

As noted, music database 104 and training example database 106 may respectively provide music samples 114a-b and training examples 118a-b to music language identification system 114. As also noted above, music language identification system 114 may music classification results to recognition database 126. In some embodiments, one or more of music database 104, training example database 106, recognition database 126, or test database 128 may be integrated with music language identification system 114. In some embodiments, the data stored in two or more of the music database 104, training example database 106, recognition database 126, or test database 128 may alternatively or additionally be stored in a single database.

Music language identification system 114, music database 104, training example database 106, recognition database 126, and test database 128 may each comprise one or more computing devices and/or network devices. For example, music language identification system 114, music database 104, training example database 106, recognition database 126, and test database 128 may each comprise one or more networked servers. Music language identification system 114, music database 104, training example database 106, recognition database 126, and test database 128 may each comprise a data storage device and/or system, such as a network-attached storage (NAS) system.

Music language identification system 114, music database 104, training example database 106, recognition database 126, and test database 128 may each be implemented in one or more computing devices. Such a computing device may comprise one or more processors and memory storing instructions that, when executed by the one or more processors, cause the computing device to perform one or more of the various methods or techniques described here. The memory may comprise volatile memory (e.g., random access memory (RAM)) and/or non-volatile memory (e.g., a hard or solid-state drive). The memory may comprise a non-transitory computer-readable medium. The computing device may comprise one or more input devices, such as a mouse, a keyboard, or a touch interface. The computing device may comprise one or more output devices, such as a monitor or other video display. The computing device may comprise an audio input and/or output. The computing device may comprise one or more network communication interfaces, such as a wireless transceiver (e.g., Wi-Fi or cellular) or wired network interface (e.g., ethernet). The one or more network communication interfaces may be configured to connect to the network 130.

In an embodiment, music 108 may be output to different client devices 132 via network 130. Music 108 may be streamed to client devices 132. Client devices 132 may be configured to access music 108. In an embodiment, one or more client devices 132 comprise a content application 134. Content application 134 outputs (e.g., display, render, present) music 108 to a user associated with client device 132. The one or more languages recognized to be associated with music 108 may be used to make song recommendations for users of client devices 132. For example, if a user of client device 132 is determined to understand Spanish or have listened to Spanish songs, pieces of music that music classification system 114 has identified as being associated with the Spanish language may be recommended to that user. In an embodiment, a user may use content application 134 on client device 132 to listen to the music 108. For example, the user may use content application 134 on client device 132 to listen to music pieces that have been recommended for that user based on one or more languages associated with the music pieces.

Client devices 132 may comprise any type of computing device, such as a mobile device, a tablet device, laptop, a desktop computer, a smart television or other smart device (e.g., smart watch, smart speaker, smart glasses, smart helmet), a gaming device, a set top box, digital streaming device, robot, and/or the like. Client devices 132 may be associated with one or more users. A single user may use one or more client devices 132 to access the cloud network 102. Client devices 132 may travel to a variety of locations and use different networks to access the cloud network 102.

As discussed above, a SLID model may be used to recognize one or more languages associated with music. FIG. 3 illustrates an example SLID model 300 that may be used to identify one or more languages associated with music, such as music 108 shown in FIG. 1. In an embodiment, SLID model 300 is part of music language identification system 114 of FIG. 1. SLID model 300 may have been trained using a process similar to that described above. SLID model 300 may receive, as input, audio data and/or metadata associated with music pieces. SLID model 300 may recognize and output languages associated with the music pieces.

In an embodiment, SLID model 300 receives both audio data, such as an audio signal 302, and metadata, such as metadata 304, associated with a piece of music. The piece of music may be a piece of music that an individual or entity wants to classify based on language. The piece of music may be an entire song or may be a portion of a song, such as a 30-second portion of a song. Audio signal 302 may include a vocal track from the piece of music and/or an instrumental track from the piece of music. The vocal track may include the lyrics of the piece of music, and the instrumental track may include the audio track of the piece of music without any vocals. Metadata 304 may indicate any information about the piece of music such as song title, album name, artist name, and/or an identification number.

In an embodiment, SLID model 300 pre-processes received audio signal 302. A sub-network 308 of SLID model 300 may be responsible for performing the pre-processing. Pre-processing audio signal 302 may involve generating information representative of audio signal 302. This information representative of audio signal 302 may be configured to be used by SLID model 300 in the language recognition process.

In an embodiment, the information representative of audio signal 302 may be an image representative of extracted features of audio signal 302. For example, the image representative of extracted features of audio signal 302 may include a spectrogram representative of how a frequency of audio signal 302 varies with time. Sub-network 308 may extract features of audio signal 302 in a variety of ways, including but not limited to one or more of a short-term Fourier transform, a mel-spectogram, a Mel-frequency cepstrum (MFCC), constant-Q transform, or a machine learning module. For example, audio signal 302 may originally be a 44.1 kHz 30-second music sample, and during pre-processing, audio signal 302 may be resampled to 22,050 Hz and converted into 128-bin log-magnitude Mel-spectrograms (128×2580) with a 1024-point fast Fourier transform and a 256 hop-size.

Figure 4:
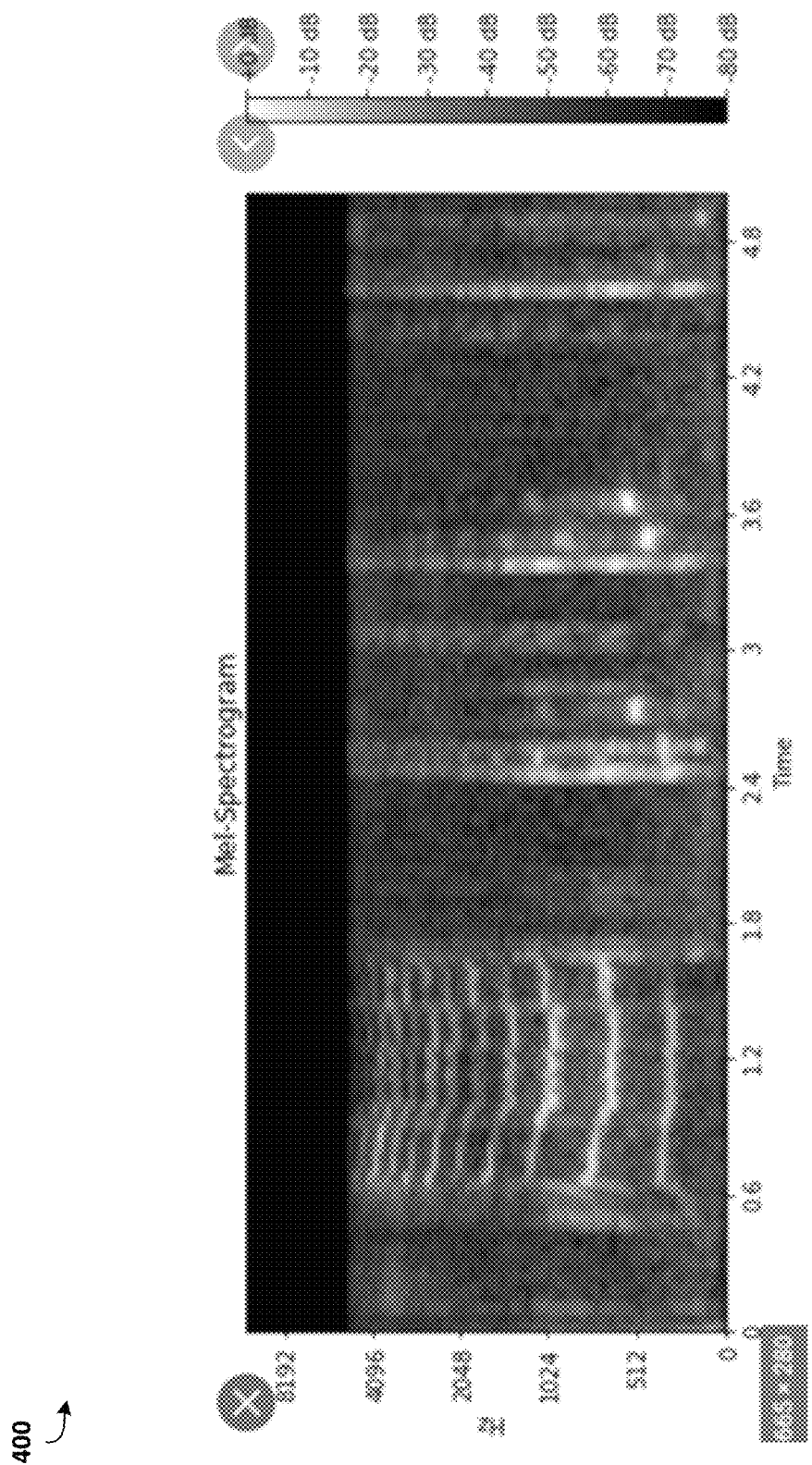
FIG. 4 illustrates an example spectrogram associated with an audio sample.

As an illustrative embodiment, FIG. 4 illustrates an example spectrogram 400 representative of features of an audio signal, such as audio signal 302. Spectrogram 400 is a mel-spectrogram. Spectrogram 400 may have been generated, for example, by sub-network 308. Spectrogram 400 may be representative of features of a 44.1 kHz 30-second music sample, such as how the frequency of the music sample varies with time. Spectrogram 400 may have been generated by resampling the music sample to 22,050 Hz and converting it into spectrogram 400 with a 1024-point fast Fourier transform and a 256 hop-size.

Referring back to FIG. 3, in an embodiment, SLID model 300 pre-processes received metadata 304. A sub-network 310 of SLID model 300 may be responsible for performing the pre-processing. Pre-processing metadata 304 may involve generating information representative of metadata 304. This information representative of metadata 304 may be configured to be used by SLID model 300 in the language recognition process.

In an embodiment, the information representative of metadata 304 may be a vector. If the information representative of metadata 304 is a vector, the vector may be representative of extracted features of metadata 304. For example, the information representative of metadata 304 may be a language probability vector. The information representative of metadata 304 may be generated in a variety of ways. In one embodiment, pre-processing metadata 304 may include joining strings of metadata 304 in an order of artist name, album name, and track title. The joined strings may be input to a language detection model, such as Python's langdetect, which may use a function, such as detect langs(s), to estimate a 56-dimensional language probability vector. A probability of 55 supported languages may be output. However, there may be some cases where the function returns an error value, such as when the text is blank or contains a numeric value. The 56-th dimension of the vector may be used to indicate those exceptions.

As an illustrative embodiment, FIGS. 5*a-b* illustrate example vectors 500, 502 representatives of extracted features of metadata, such as metadata 304. Vectors 500, 502 are 56-dimensional language probability vectors. Vectors 500, 502 may be generated by joining strings of metadata, such as metadata 304, in an order of artist name, album name, and track title. The joined strings may be input to a language detection model, such as Python's langdetect, which may use a function, such as detect langs(s), to estimate vectors 500, 502. Vector 500 indicates that a first set of metadata has a 28% probability of being associated with Afrikaans and an 71% probability of being associated with Portuguese. Vector 502 indicates that a second set of metadata has a 99.999% probability of being associated with English.

Referring back to FIG. 3, if the information representative of metadata 304 is a language probability vector, the precision of the language probability vector may be dependent on which strings of metadata 304 are used to generate the language probability vector. For example, as discussed above, metadata 304 may include artist name, album name, and track title. The performance of the language detection model may depend on which strings of metadata are input to the language detection model.

FIG. 6 illustrates an example table 600 depicting a macro averaged performance of a language detection model, such as Python's langdetect with various metadata string inputs. For example, table 600 shows that if a language detection model receives only the artist name as input, the language detection model has a precision of 0.323, a recall of 0.221, and an F1-score of 0.149. An F1-score is a weighted average of the precision and recall, where an F1 score reaches its best value at 1 and worst score at 0. Table 600 also shows that if a language detection model receives only the album name as input, the language detection model has a precision of 0.399, a recall of 0.378, and an F1-score of 0.284. Additionally, table 600 shows that if a language detection model receives only the track title as input, the language detection model has a precision of 0.450, a recall of 0.444, and an F1-score of 0.317.

The performance of the language detection model improves when it receives all of the artist name, album name, and track title joined together as input. Table 600 shows that if a language detection model receives all of the artist name, album name, and track title joined together as input, the language detection model has a precision of 0.510, a recall of 0.569, and an F1-score of 0.429. As an F1-score reaches its best value at 1 and worst score at 0, the F1-score of 0.429 is significantly better than the F1-score when the language detection model receives only the track title, only the album name, or only the track title as input. While FIG. 6*a* depicts the macro-averaged performance of the language detection model with all metadata strings joined together, the weighted average precision/recall/F1-score are 0.922/0.819/0.857, respectively.

The precision of the language probability vector may be different for different languages. For example, the language detection model may be able to recognize certain languages within music with a higher precision than other languages. The languages that are more prevalent in the training data for the language detection model may, for example, be able to be recognized with a higher precision than those languages that are less prevalent in the training data.

Referring back to FIG. 3, in an embodiment, SLID model 300 inputs information representative of audio signal 302, such as a spectrogram representative of audio signal 302 generated during pre-processing, into a sub-network 316. Sub-network 316 may be a convolutional neural network, such as ResNet-50, and may include 64 base channels. Sub-network 316 may use the information representative of audio signal 302 to generate a vector. For example, sub-network 316 may receive, as input, the information representative of audio signal 302, such as a spectrogram representative of audio signal 302, and output a 2048-channel feature map, such as a feature map that has a size of (4×81). Sub-network 316 may then apply a global average pooling to the 2048-channel feature map, and output a one-dimensional vector, such as a one-dimensional vector with a length of 2048.

In an embodiment, SLID model 300 inputs information representative of metadata 304, such as a language probability vector generated during pre-processing, into a sub-network 318. Sub-network 318 may be a neural network, such as a feedforward artificial neural network. For example, sub-network 318 may be a 3-layer multilayer perceptron (MLP), where each of the three layers includes a 128-unit fully connected layer, a batch normalization layer, and an activation function, such as a rectified linear activation function (ReLU). Sub-network 318 may receive as input, the information representative of metadata 304, such as a 56-dimensional language probability vector, and output a one-dimensional vector, such as a one-dimensional vector with a length of 128.

As described above, existing SLID models aim to identify language within music using only a portion of the music data—some use solely audio content, others use track title and album name. Because these existing SLID models use only a portion of the music data, they are not able to identify language within music with a high accuracy rate. SLID model 300 is able to identify language within music with a higher accuracy rate than existing SLID models because SLID model 300 has been trained using training examples at least a majority of which comprise audio data, metadata and information indicating at least one language associated with each training example. To use both audio data and metadata associated with music to identify one or more languages associated with the music, SLID model 300 may concatenate the output of audio sub-network 316 and metadata sub-network 318. To concatenate the output of audio sub-network 316 and metadata sub-network 318, SLID model 300 may input the output of audio sub-network 316 and metadata sub-network 318 into a sub-network 320. Sub-network 320 may concatenate the output of audio sub-network 316 and metadata sub-network 318. Sub-network 320 may include a machine learning module, such as an MLP or a convolutional neural network.

SLID model 300 may input this concatenation into a sub-network 322. Sub-network 322 may be a neural network, such as a feedforward artificial neural network. For example, sub-network 322 may be an MLP, such as an MLP that includes a 256-unit fully-connected hidden layer, a batch normalization layer, an activation function, such as a rectified linear activation function (ReLU), and an 11-unit fully connected layer with a Softmax activation. Sub-network 322 may receive as input, from sub-network 320, the concatenation, and output a language estimate 324. Language estimate 324 may indicate one or more languages recognized to be associated with a particular music piece. As discussed above, a language may be associated with a particular music piece if the language is used in the lyrics of the music piece. Additionally, or alternatively, a language may be associated with a particular piece of music if it is a language commonly spoken in a geographic region associated with some other feature of the music sample, such as an instrument used in the music piece. Additionally, or alternatively, a language may be associated with a particular piece of music if it is associated with a song title, album title, or artist name of the music piece.

Figure 7:
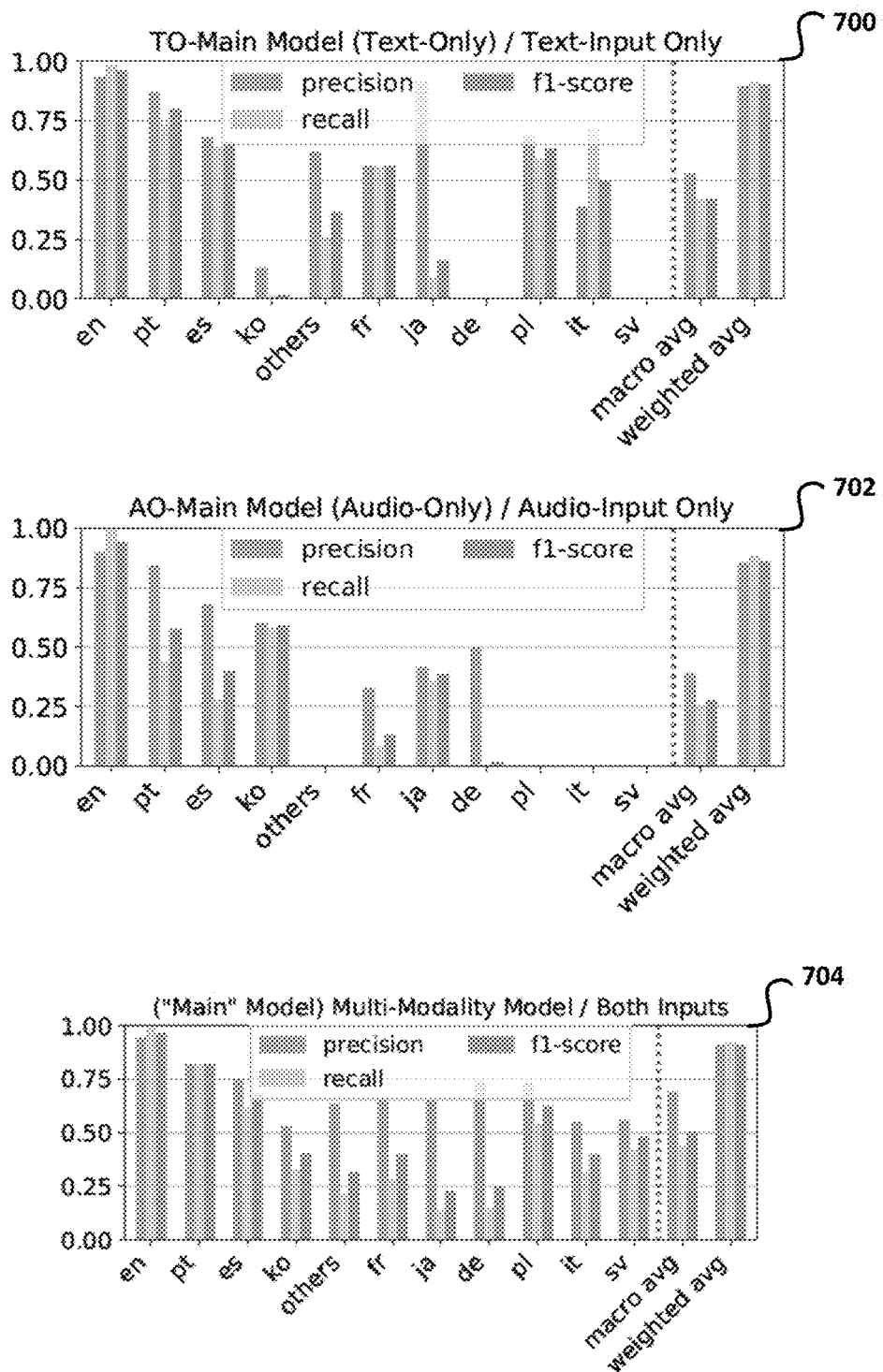
FIG. 7 illustrates example graphs depicting the varying performance ability of different language identification models.

As discussed above, existing SLID models do not utilize all of the information utilized by an advanced SLID model, such as SLID model 300. For example, some existing SLID models use audio data or metadata, but existing SLID models do not utilize both. An advanced SLID model, such as SLID model 300, performs significantly better than existing SLID models by utilizing more information—both audio data and metadata. FIG. 7 illustrates example graphs depicting the performance ability an SLID model trained on only audio data, an SLID model trained on only metadata, and an advanced SLID model, such as SLID model 300, that is trained on both audio data and metadata.

The graph 700 illustrates the performance of an example SLID model trained on text (i.e. metadata) only. Its precision, recall, and F1-score are 0.526/0.415/0.422 (macro averaging) and 0.896/0.914/0.900. (weighted averaging). The SLID model trained on text-only is heavily affected by the class imbalance of the training set. The SLID model trained on text-only leads to a negative effect for some languages. For example, the SLID model trained on text-only completely fails at identifying languages such as "Korean," "Japanese," "German," and "Slovakian." The graph 702 illustrates the performance of an example SLID model trained on audio-only. The precision, recall, and F1-score are respectively 0.387/0.248/0.275 (macro averaging) and 0.852/0.884/0.857 (weighted averaging). The SLID model trained on audio-only leads to a negative effect for some languages. For example, the SLID model trained on audio-only completely fails at identifying languages such as "Others," "Polish," "Italian," and "Slovakian." As illustrated by a comparison of graph 700 and graph 702, the SLID model trained on text-only outperformed the SLID model trained on audio only. However, this does not mean that audio is less useful than metadata for music language recognition. Rather, these results may indicate that the information from metadata input is almost saturated, and that by better understanding the audio data associated with a song, an improved SLID model may be generated.

The graph 704 illustrates the performance of an example advanced SLID model, such as SLID model 300, trained on both audio and metadata. The precision, recall, and F1-score are respectively 0.688/0.435/0.504 (macro averaging) and 0.911/0.922/0.911 (weighted averaging). The graph 702 shows a performance improvement over the performances illustrated in both graph 700 and graph 702 emphasizing the benefit of using multi-modal information. Among languages, graph 704 illustrates that the advanced SLID model shows low recall rates for "Korean," "French," "Japanese," "German," and "Italian." The class imbalance of the training set may be responsible for these low recall rates, as a classification of unconfident items is likely to be biased towards "English." Graph 704 also illustrates that the overall improvement of the F1-score over that of graphs 700 and 702 benefitted a number of languages, including popular languages, such as "English," "Spanish," "Korean," and "Others" and also some less popular languages, such as "Italian" and "Slovakian." Notably, both the text-only and audio-only SLID models completely failed at identifying "Slovakian."

The various sub-networks of SLID model 300 may function as hidden layers in the overall SLID model 300. For example, sub-network 316 processes the audio data and sub-network 318 processes the metadata, and the output from both of these sub-networks feed into the sub-network 320. The output of sub-network 320 then feeds into sub-network 322. The output of sub-network 322 is the desired language recognition result. The SLID model 300 is not trained to provide intermediary results. Rather, the SLID model 300 is trained to provide the desired output from the overall SLID model 300.

Figure 8:
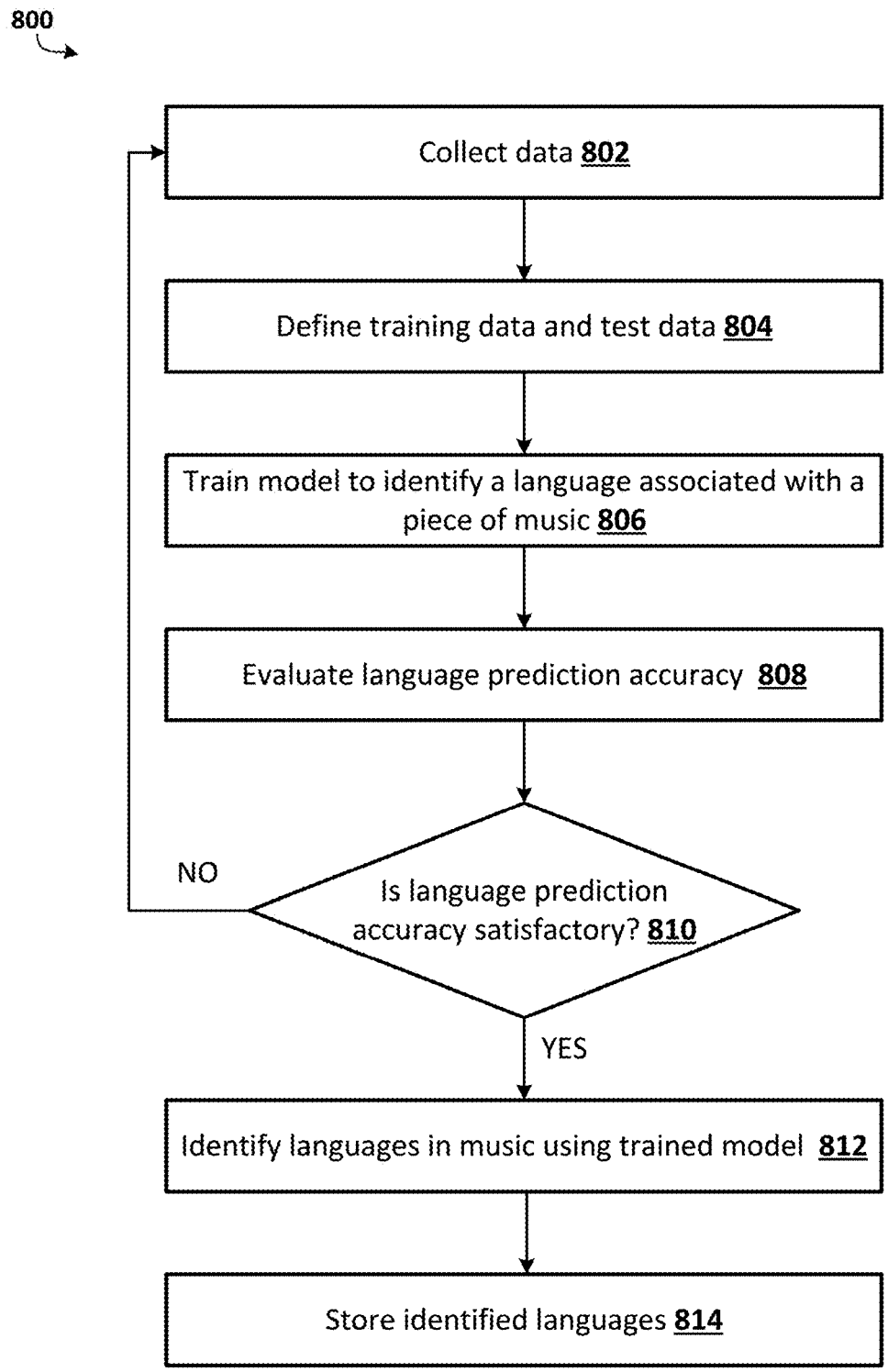
FIG. 8 illustrates an example process for training and applying a language identification model that may be used in accordance with the present disclosure.

FIG. 8 depicts an example process 800 for training and applying a SLID model, such as SLID model 300. The process 800 may be performed, for example, by music language identification system 114 of FIG. 1. As discussed above, an SLID model needs to be trained and tested before it is used to recognize languages associated with music. To train and test the SLID model, training data and testing data may be generated. Training and testing data may be generated using different datasets. At 802, data is collected. The data may be collected from a dataset including music samples. Each of the music samples may be an entire song or may be a portion of a song, such as a 30-second portion of a song. Each of the music samples may be associated with audio data (i.e. an audio clip) and/or metadata. If a music sample is associated with audio data, the audio data may include a vocal track from the music sample and/or an instrumental track from the music sample. The vocal track may include the lyrics of the music sample, and the instrumental track may include the audio track of the music sample without any vocals. If a music sample is associated with metadata, the metadata may indicate any information about the music sample, such as song title, album name, artist name, and/or an identification number.

The collected data may be used to generate training data and/or test data that can be used to train and/or test the SLID model. At 804, training examples and/or test examples are defined. As discussed above, the training examples for the SLID model may be generated in a variety of different ways. For example, the training examples may be manually generated using manual data entry. The training examples may additionally, or alternatively, be generated automatically using a computer. The training examples used to train the SLID model may comprise either positive training examples or a combination of positive training examples and negative training examples. The number of training examples used to train the SLID model may vary, but in an embodiment, over 100,000 training examples are used to train the SLID model.

The training examples may indicate one or more languages associated with a plurality of different music samples, such as music samples collected at 802. The one or more languages associated with a particular music sample may indicate one or more languages used in the lyrics of the music sample. For example, if a music sample features a woman singing in French and a man rapping in English, that music sample may be associated with both the French and English languages. Additionally, or alternatively, the one or more languages associated with a particular music sample may indicate a language commonly spoken in a geographic region associated with some other feature of the music sample. For example, if a particular instrument used in a music sample is native to Mexico, the one or more languages associated with that music sample may include Spanish regardless of whether the lyrics of that song are in Spanish.

Each of the music samples in the training examples may be associated with audio data (i.e. an audio clip) and/or metadata. If a music sample is associated with audio data, the audio data may include a vocal track from the music sample and/or an instrumental track from the music sample. The vocal track may include the lyrics of the music sample, and the instrumental track may include the audio track of the music sample without any vocals. If a music sample is associated with metadata, the metadata may indicate any information that exists and is easily accessible for a majority of music tracks, such as song title, album name, artist name, and/or an identification number. As also discussed above, the test examples that are used to test the SLID may be similar to the training examples used to train the SLID model. For example, each test example may include audio data and/or metadata and one or more languages associated with each of a variety of music samples.

The SLID model may be trained on the generated training data. At 806, the SLID model may be trained to identify one or more languages associated with a piece of music. The generated training examples may be used to train the SLID model. The audio data and/or metadata of the training examples may be paired with the expected output (i.e. the language(s) that have already been associated with the music samples). By pairing the audio data and/or metadata with the known languages in the respective music samples and using these pairs to train the SLID model, the SLID model may learn to associate particular features of audio data and/or metadata with different languages.

In an embodiment, it is desirable to train the SLID model in such a way that it is still able to recognize one or more languages associated with a music sample that is missing either audio data or metadata. To train the SLID model in this way, a technique called Dropout may be used when generating the training examples. In a dropout module, the audio data of a certain percentage of the music samples used in the training examples, such as 5%, 10%, 30% or any other percentage of music samples, may be "dropped out." Similarly, the metadata of a certain percentage of the music samples used in the training examples may be "dropped out." This means that out of the entire set of training examples, a certain percentage of training examples would have a zero value for the audio data, and a certain percentage of training examples would have a zero value for the metadata. The training examples that have a zero value for audio data may be associated with different music samples that the training examples that have a zero value for metadata. A certain percentage of the training examples, such as a majority of the training examples, may have not have a zero value for either the audio data or the metadata (i.e. neither the audio data nor the metadata was "dropped out" for those music samples.) In this way, missing modality cases may be simulated while training the SLID model. As a result, a single SLID model can be used to recognize language within music even if there is a missing modality of a particular piece of music.

The SLID model may need to be trained on a large number of training examples or a variety of different training examples before it has learned enough to make accurate language recognition. The desired recognition accuracy level may be determined by the entity or individual training the SLID model, and the SLID model may continue to be trained until it has learned enough to make language recognition with the desired level of accuracy. To determine if the SLID model is making language recognition with the desired level of accuracy, the SLID model may be tested. The SLID model may be tested using the generated test data. At 808, the language recognition accuracy of the SLID model may be evaluated. To test the SLID model, the generated test examples may be input to the SLID model, and the output of the SLID model may be compared to an expected result.

While, like the training examples, the test examples include one or more languages associated with that music sample, the one or more languages are not input into the SLID model during testing. Rather, only audio data and/or metadata associated with the music samples may be input to the SLID model to see which languages the SLID model recognizes are associated with the music samples. The recognition results may be compared to the languages indicated by information included in the test examples (i.e. the expected results.)

If the recognition results do not match the expected results, the SLID model may need to be trained on more and/or a greater variety of training examples. This process of training and testing may be repeated over and over again until the SLID model is producing recognition results at the desired level of accuracy. At 810 it may be determined whether the language recognition accuracy is satisfactory. The language recognition accuracy may be satisfactory if it meets or exceeds the desired level of accuracy. Conversely, the language recognition accuracy may not be satisfactory if it does not meet or exceed the desired level of accuracy. If the language recognition accuracy is not satisfactory, method 800 may return to 802 to collect more data. Additional training examples and/or testing examples may be generated based on this newly collected data, the SLID model may be further trained based on these new training examples, and re-tested. This process may continue until the language recognition accuracy is satisfactory.

If the language recognition accuracy is satisfactory, method 800 may proceed to 812. At 812, languages in pieces of music may be identified using the trained SLID model. The one or more languages associated a particular piece of music may indicate one or more languages used in the lyrics of the music sample. For example, if a piece of music features a woman singing in French and a man rapping in English, that piece of music may be associated with both the French and English languages. Additionally, or alternatively, the one or more languages associated with a particular piece of music may indicate a language commonly spoken in a geographic region associated with some other feature of the music sample. For example, if a particular instrument used in a music sample is native to Mexico, the one or more languages associated with that piece of music may include Spanish regardless of whether the lyrics of that song are in Spanish.

At 814, the identified languages and their associated music pieces may be stored. For example, the identified languages and their associated music pieces may be stored in a database, such as recognition database 126. Once stored, this information may be used to make song recommendations, such as for users of client devices 132. For example, if a user is known to speak or understand Spanish, stored pieces of music that are associated with the Spanish language may be recommended to that user. In an embodiment, a user may use a content application, such as content application 134 on client device 132 to listen to the recommended music.

Figure 9:
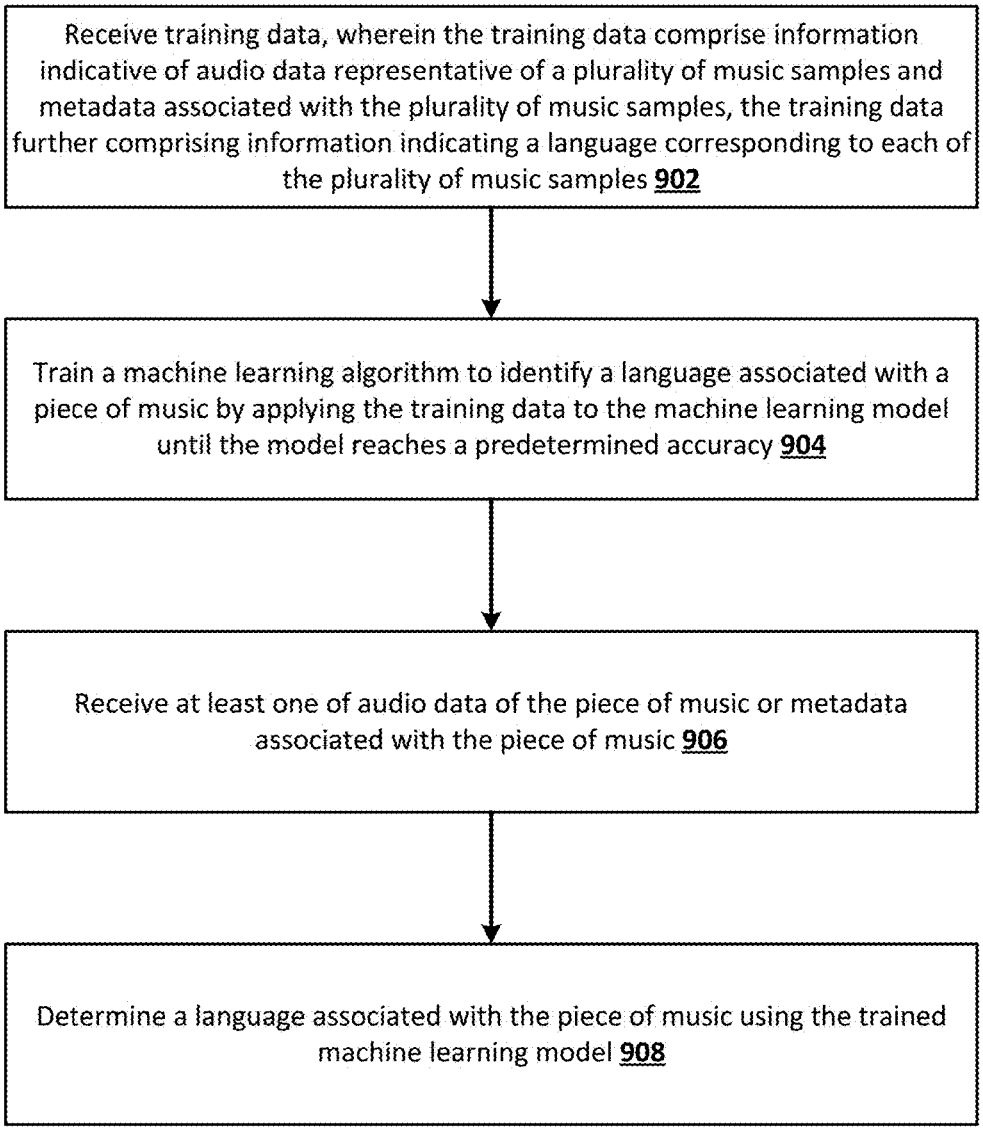
FIG. 9 illustrates an example process for training and applying a language identification model that may be used in accordance with the present disclosure.

FIG. 9 depicts an example process 900 for training and applying a machine learning model, such as SLID model 300. The process 900 may be performed, for example, by music language identification system 114 as shown in FIG. 1. As discussed above, an SLID model needs to be trained before it is used to recognize languages associated with music. To train the SLID model, training data, such as training examples, may be generated. The training examples used to train the SLID model may be generated in a variety of different ways. For example, the training examples may be manually generated using manual data entry. The training examples may additionally, or alternatively, be generated automatically using a computer. The training examples used to train the SLID model may comprise either positive training examples or a combination of positive training examples and negative training examples. The number of training examples used to train the SLID model may vary, but in an embodiment, over 100,000 training examples are used to train the SLID model.

At 902, training data may be received. The training data comprise information indicative of audio data representative of a plurality of music samples, metadata associated with the plurality of music samples, and information indicating at least one language corresponding to each of the plurality of music samples. One or more languages associated with a particular music sample may indicate one or more languages used in the lyrics of the music sample. For example, if a music sample features a woman singing in French and a man rapping in English, that music sample may be associated with both the French and English languages. Additionally, or alternatively, the one or more languages associated with a particular music sample may indicate a language commonly spoken in a geographic region associated with some other feature of the music sample. For example, if a particular instrument used in a music sample is native to Mexico, the one or more languages associated with that music sample may include Spanish regardless of whether the lyrics of that song are in Spanish. In an embodiment, each the training examples may be classified into one or more of a plurality of different languages. For example, there may be 46 language labels in the dataset, including, but not limited to, English, Portuguese, Spanish, Korean, French, Japanese, German, Polish, Italian, Slovakian, and others.

Each of the music samples may be an entire song or may be a portion of a song, such as a 30-second portion of a song. Each of the music samples may be associated with audio data (i.e. an audio clip) and/or metadata. If a music sample is associated with audio data, the audio data may include a vocal track from the music sample and/or an instrumental track from the music sample. The vocal track may include the lyrics of the music sample, and the instrumental track may include the audio track of the music sample without any vocals. If a music sample is associated with metadata, the metadata may indicate any information that exists about the music sample, such as song title, album name, artist name, and/or an identification number.

A machine learning model may be trained using the training data. At 904, a machine learning model may be trained to identify a language associated with a piece of music using the training data. The machine learning model may be trained by applying the training data to the machine learning model until the model reaches a predetermined recognition accuracy. Applying the training data to the machine learning model may involve pairing the audio data and/or metadata of the training examples with the expected output (i.e. the language(s) that have already been associated with the music samples). By pairing the audio data and/or metadata with the known languages in the respective music samples and using these pairs to train the machine learning model, the machine learning model may learn to associate particular features of audio data and/or metadata with different languages.

In an embodiment, it is desirable to train the machine learning model in such a way that it is still able to recognize one or more languages associated with a music sample that is missing either audio data or metadata. To train the machine learning model in this way, a technique called Dropout may be used when generating the training examples. In a dropout module, the audio data of a certain percentage of the music samples used in the training examples, such as 5%, 10%, 30% or any other percentage of music samples, may be "dropped out." Similarly, the metadata of a certain percentage of the music samples used in the training examples may be "dropped out." This means that out of the entire set of training examples, a certain percentage of training examples would have a zero value for the audio data, and a certain percentage of training examples would have a zero value for the metadata. The training examples that have a zero value for audio data may be associated with different music samples that the training examples that have a zero value for metadata. A certain percentage of the training examples, such as a majority of the training examples, may have not have a zero value for either the audio data or the metadata (i.e. neither the audio data nor the metadata was "dropped out" for those music samples.) In this way, missing modality cases may be simulated while training the machine learning model. As a result, a single machine learning model can be used to recognize language within music even if there is a missing modality of a particular piece of music.

The machine learning model may need to be trained on a large number of training examples or a variety of different training examples before it has learned enough to make accurate language recognition. The desired accuracy recognition level may be determined by the entity or individual training the machine learning model, and the machine learning model may continue to be trained until it has learned enough to make language recognition with the desired level of accuracy. To determine if the machine learning model is making language recognition with the desired level of accuracy, the machine learning model may be tested and the language recognition accuracy of the machine learning model may be evaluated. To test the machine learning model, test examples may be input to the machine learning model, and the output of the machine learning model may be compared to an expected result.

Once trained, the machine learning model may be used to recognize language associated with at least one piece of music. To recognize one or more languages associated with a piece of music, audio data and/or metadata associated with the piece of music may be received. At 906, at least one of audio data of a piece of music or metadata associated with a piece of music may be received. The piece of music may be a piece of music that an individual or entity wants to classify based on language. The piece of music may be an entire song or may be a portion of a song, such as a 30-second portion of a song. The audio data may include a vocal track from the piece of music and/or an instrumental track from the piece of music. The vocal track may include the lyrics of the piece of music, and the instrumental track may include the audio track of the piece of music without any vocals. The metadata may indicate any information about the piece of music such as song title, album name, artist name, and/or an identification number.

In an embodiment, the information indicative of audio data representative of a piece of music is an image representative of extracted features of the audio data of the piece of music. For example, the information indicative of audio data representative of a piece of music may be a mel-spectogram or a mel-frequency cepstrum (MFCC) representative of how a frequency of the audio signal of the music sample varies with time. The spectrogram may have been generated using any system or technique, such as using a short-term Fourier transform or a machine learning module. In an embodiment, the information indicative of metadata associated with a piece of music may be a vector representative of extracted features of the metadata of the piece of music. For example, the vector may be a language probability vector.

At 908, at least one language associated with the piece of music may be determined based on the received data using the trained machine learning model. The one or more languages associated a particular piece of music may indicate one or more languages used in the lyrics of the music sample. For example, if a piece of music features a woman singing in French and a man rapping in English, that piece of music may be associated with both the French and English languages. Additionally, or alternatively, the one or more languages associated with a particular piece of music may indicate a language commonly spoken in a geographic region associated with some other feature of the music sample. For example, if a particular instrument used in a music sample is native to Mexico, the one or more languages associated with that piece of music may include Spanish regardless of whether the lyrics of that song are in Spanish.

Determining the at least one language associated with the piece of music may be accomplished by generating, based on the information indicative of audio data representative of the piece of music, a first vector representative of an audio signal of the piece of music, and generating, based on the information indicative of the metadata associated with the piece of music, a second vector representative of the metadata of the piece of music. The first vector and second vector may be combined, or concatenated, and the combination may be used to recognize at least one language associated with the piece of music. However, as discussed above, the machine learning model is trained to recognize one or more languages associated with a piece of music even if there is a missing modality of that particular piece of music. For example, a piece of music may not be associated with either audio data or metadata. The machine learning model may still be able to recognize one or more languages associated with that piece of music.

The recognize recognition of one or more languages associated with music piece may be stored in a database, such as in recognition database 126. Once stored, this information may be used to make song recommendations, such as for users of client devices 132. For example, if a user is known to speak or understand Spanish, stored pieces of music that are associated with the Spanish language may be recommended to that user. In an embodiment, a user may use a content application, such as content application 134 on client device 132 to listen to the recommended music.

Figure 10:
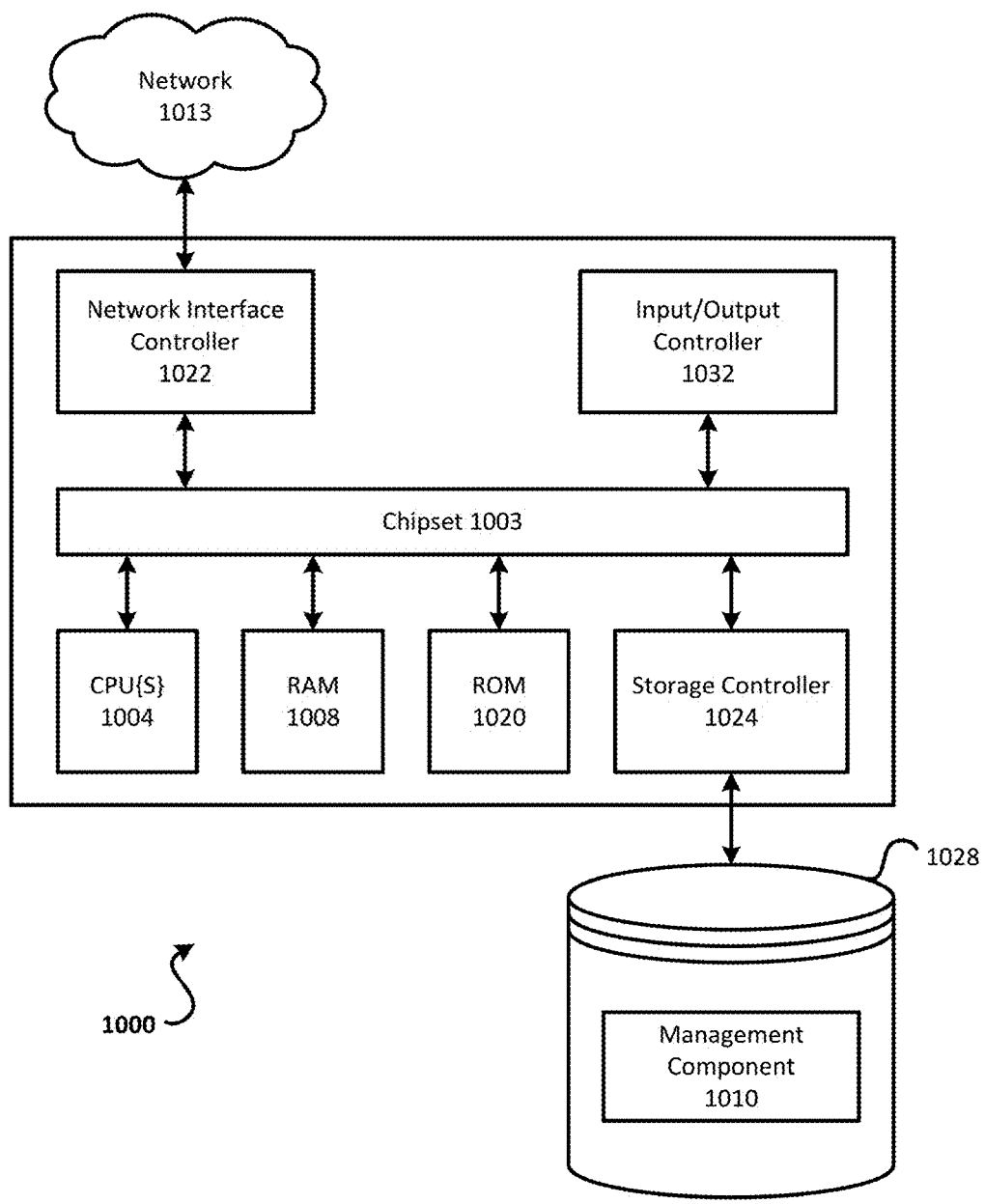
FIG. 10 illustrates an example computing device that may be used in accordance with the present disclosure.

FIG. 10 depicts a computing device that may be used in various aspects. With regard to the example environment of FIG. 1, one or more of music language identification system 114, music database 104, training example database 106, recognition database 126, or test database 128 may be implemented in an instance of a computing device 1000 of FIG. 10. The computer architecture shown in FIG. 10 shows a conventional server computer, workstation, desktop computer, laptop, tablet, network appliance, PDA, e-reader, digital cellular phone, or other computing node, and may be utilized to execute any aspects of the computers described herein, such as to implement the methods described in FIG. 2, 8, or 9.

The computing device 1000 may include a baseboard, or "motherboard," which is a printed circuit board to which a multitude of components or devices may be connected by way of a system bus or other electrical communication paths. One or more central processing units (CPUs) 1004 may operate in conjunction with a chipset 1006. The CPU(s) 1004 may be standard programmable processors that perform arithmetic and logical operations necessary for the operation of the computing device 1000.

The CPU(s) 1004 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1004 may be augmented with or replaced by other processing units, such as GPU(s) 905. The GPU(s) 905 may comprise processing units specialized for but not necessarily limited to highly parallel computations, such as graphics and other visualization-related processing.

A user interface may be provided between the CPU(s) 1004 and the remainder of the components and devices on the baseboard. The interface may be used to access a random access memory (RAM) 1008 used as the main memory in the computing device 1000. The interface may be used to access a computer-readable storage medium, such as a read-only memory (ROM) 1020 or non-volatile RAM (NVRAM) (not shown), for storing basic routines that may help to start up the computing device 1000 and to transfer information between the various components and devices. ROM 1020 or NVRAM may also store other software components necessary for the operation of the computing device 1000 in accordance with the aspects described herein. The user interface may be provided by a one or more electrical components such as the chipset 1006.

The computing device 1000 may operate in a networked environment using logical connections to remote computing nodes and computer systems through local area network (LAN) 1016. The chipset 1006 may include functionality for providing network connectivity through a network interface controller (NIC) 1022, such as a gigabit Ethernet adapter. A NIC 1022 may be capable of connecting the computing device 1000 to other computing nodes over a network 1016. It should be appreciated that multiple NICs 1022 may be present in the computing device 1000, connecting the computing device to other types of networks and remote computer systems.

The computing device 1000 may be connected to a storage device 1028 that provides non-volatile storage for the computer. The storage device 1028 may store system programs, application programs, other program modules, and data, which have been described in greater detail herein. The storage device 1028 may be connected to the computing device 1000 through a storage controller 1024 connected to the chipset 1006. The storage device 1028 may consist of one or more physical storage units. A storage controller 1024 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1000 may store data on a storage device 1028 by transforming the physical state of the physical storage units to reflect the information being stored. The specific transformation of a physical state may depend on various factors and on different implementations of this description. Examples of such factors may include, but are not limited to, the technology used to implement the physical storage units and whether the storage device 1028 is characterized as primary or secondary storage and the like.

For example, the computing device 1000 may store information to the storage device 428 by issuing instructions through a storage controller 1024 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1000 may read information from the storage device 1028 by detecting the physical states or characteristics of one or more particular locations within the physical storage units.

In addition or alternatively to the storage device 1028 described herein, the computing device 1000 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1000.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A storage device, such as the storage device 1028 depicted in FIG. 10, may store an operating system utilized to control the operation of the computing device 1000. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The storage device 1028 may store other system or application programs and data utilized by the computing device 1000.

The storage device 1028 or other computer-readable storage media may also be encoded with computer-executable instructions, which, when loaded into the computing device 400, transforms the computing device from a general-purpose computing system into a special-purpose computer capable of implementing the aspects described herein. These computer-executable instructions transform the computing device 1000 by specifying how the CPU(s) 1004 transition between states, as described herein. The computing device 1000 may have access to computer-readable storage media storing computer-executable instructions, which, when executed by the computing device 1000, may perform the methods described in relation to FIG. 2, 8, or 9.

A computing device, such as the computing device 1000 depicted in FIG. 10, may also include an input/output controller 1032 for receiving and processing input from a number of input devices, such as a keyboard, a mouse, a touchpad, a touch screen, an electronic stylus, or other type of input device. Similarly, an input/output controller 1032 may provide output to a display, such as a computer monitor, a flat-panel display, a digital projector, a printer, a plotter, or other type of output device. It will be appreciated that the computing device 1000 may not include all of the components shown in FIG. 10, may include other components that are not explicitly shown in FIG. 10, or may utilize an architecture completely different than that shown in FIG. 10.

As described herein, a computing device may be a physical computing device, such as the computing device 1000 of FIG. 10. A computing node may also include a virtual machine host process and one or more virtual machine instances. Computer-executable instructions may be executed by the physical hardware of a computing device indirectly through interpretation and/or execution of instructions stored and executed in the context of a virtual machine.

One skilled in the art will appreciate that the systems and methods disclosed herein may be implemented via a computing device that may comprise, but are not limited to, one or more processors, a system memory, and a system bus that couples various system components including the processor to the system memory. In the case of multiple processors, the system may utilize parallel computing.

For purposes of illustration, application programs and other executable program components such as the operating system are illustrated herein as discrete blocks, although it is recognized that such programs and components reside at various times in different storage components of the computing device, and are executed by the data processor(s) of the computer. An implementation of service software may be stored on or transmitted across some form of computer-readable media. Any of the disclosed methods may be performed by computer-readable instructions embodied on computer-readable media. Computer-readable media may be any available media that may be accessed by a computer. By way of example and not meant to be limiting, computer-readable media may comprise "computer storage media" and "communications media." "Computer storage media" comprise volatile and non-volatile, removable and non-removable media implemented in any methods or technology for storage of information such as computer-readable instructions, data structures, program modules, or other data.

Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by a computer. Application programs and the like and/or storage media may be implemented, at least in part, at a remote system.

As used in the specification and the appended claims, the singular forms "a," "an" and "the" include plural referents unless the context clearly dictates otherwise. Ranges may be expressed herein as from "about" one particular value, and/or to "about" another particular value. Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that an order be inferred, in any respect.

It will be apparent to those skilled in the art that various modifications and variations may be made without departing from the scope or spirit. Other embodiments will be apparent to those skilled in the art from consideration of the specification and practice disclosed herein. It is intended that the specification and examples be considered as exemplary only, with a true scope and spirit being indicated by the following claims.

What is claimed is:

1. A method of recognizing languages in music by a machine learning model, comprising:
    receiving at least one of audio data of a piece of music or metadata associated with the piece of music by the machine learning model trained to recognize the languages in music, wherein the machine learning model is pre-trained using training data, the training data comprise information indicative of audio data representative of a plurality of music samples and metadata associated with the plurality of music samples, and the training data further comprise information indicating a language corresponding to each of the plurality of music samples, wherein the machine learning model is pre-trained to directly associate audio data and metadata of particular pieces of music with different languages, wherein receiving the audio data of the piece of music comprises generating an image representative of the audio data of the piece of music by preprocessing the audio data of the piece of music, and wherein the image representative of the audio data of the piece of music comprises a spectrogram representative of how a frequency of an audio signal of the piece of music varies with time; and
    determining a language associated with the piece of music based on the at least one of the audio data of the piece of music or the metadata associated with the piece of music by the machine learning model.

2. The method of claim 1, further comprising:
    generating a numerical representative of extracted features of the metadata associated with the piece of music by preprocessing the metadata associated with the piece of music.

3. The method of claim 1, wherein the determining a language associated with the piece of music using the model comprises:
    generating, based on the audio data of the piece of music, a first vector representative of the audio data of the piece of music;
    generating, based on the metadata associated with the piece of music, a second vector representative of the metadata associated with the piece of music; and
    determining, based on the first vector and the second vector, the language associated with the piece of music.

4. The method of claim 3, wherein the determining, based on the first vector and the second vector, the language associated with the piece of music further comprises:
    concatenating the first vector and the second vector; and
    outputting information indicative of the language associated with the piece of music.

5. The method of claim 1, wherein the audio data of the piece of music comprise information indicative of a vocal track of the piece of music and information indicative of an instrumental track of the piece of music.

6. The method of claim 1, wherein the metadata associated with the piece of music comprise at least one of a song title, an album name, an artist name, or an identification number.

7. A system of recognizing languages in music, comprising:
    at least one processor; and
    at least one memory communicatively coupled to the at least one processor and storing instructions that upon execution by the at least one processor cause the system to perform operations comprising:
    receiving at least one of audio data of a piece of music or metadata associated with the piece of music by a machine learning model trained to recognize the languages in music, wherein the machine learning model is pre-trained using training data, the training data comprise information indicative of audio data representative of a plurality of music samples and metadata associated with the plurality of music samples, and the training data further comprise information indicating a language corresponding to each of the plurality of music samples, wherein the machine learning model is pre-trained to directly associate audio data and metadata of particular pieces of music with different languages, wherein receiving the audio data of the piece of music comprises generating an image representative of the audio data of the piece of music by preprocessing the audio data of the piece of music, and wherein the image representative of the audio data of the piece of music comprises a spectrogram representative of how a frequency of an audio signal of the piece of music varies with time; and
    determining a language associated with the piece of music based on the at least one of the audio data of the piece of music or the metadata associated with the piece of music by the machine learning model.

8. The system of claim 7, further comprising:
    generating a numerical representative of extracted features of the metadata associated with the piece of music by preprocessing the metadata associated with the piece of music.

9. The system of claim 7, the operations further comprising:
    generating, based on the audio data of the piece of music, a first vector representative of the audio data of the piece of music;

generating, based on the metadata associated with the piece of music, a second vector representative of the metadata associated with the piece of music; and determining, based on the first vector and the second vector, the language associated with the piece of music using the model.

10. The system of claim 9, wherein the determining, based on the first vector and the second vector, the language associated with the piece of music further comprises:

concatenating the first vector and the second vector; and outputting information indicative of the language associated with the piece of music.

11. The system of claim 7, wherein the audio data of the piece of music comprise information indicative of a vocal track of the piece of music and information indicative of an instrumental track of the piece of music.

12. The system of claim 7, wherein the metadata associated with the piece of music comprise at least one of a song title, an album name, an artist name, or an identification number.

13. A non-transitory computer-readable storage medium, storing computer-readable instructions that upon execution by a processor cause the processor to implement operations comprising:

receiving at least one of audio data of a piece of music or metadata associated with the piece of music by a machine learning model trained to recognize languages in music, wherein the machine learning model is pre-trained using training data, the training data comprise information indicative of audio data representative of a plurality of music samples and metadata associated with the plurality of music samples, and the training data further comprise information indicating a language corresponding to each of the plurality of music samples, wherein the machine learning model is pre-trained to directly associate audio data and metadata of particular pieces of music with different languages, wherein receiving the audio data of the piece of music comprises generating an image representative of the audio data of the piece of music by preprocessing the audio data of the piece of music, and wherein the image representative of the audio data of the piece of music comprises a spectrogram representative of how a frequency of an audio signal of the piece of music varies with time; and determining a language associated with the piece of music based on at least one of the audio data of the piece of music or the metadata associated with the piece of music by the machine learning model.

14. The non-transitory computer-readable storage medium of claim 13, the operations further comprising:

generating a numerical representative of extracted features of the metadata associated with the piece of music by preprocessing the metadata associated with the piece of music.

15. The non-transitory computer-readable storage medium of claim 13, the operations further comprising:

generating, based on the audio data of the piece of music, a first vector representative of the audio data of the piece of music;

generating, based on the metadata associated with the piece of music, a second vector representative of the metadata associated with the piece of music; and determining, based on the first vector and the second vector, the language associated with the piece of music.

16. The non-transitory computer-readable storage medium of claim 15, the operations further comprising:

concatenating the first vector and the second vector; and outputting information indicative of the language associated with the piece of music.

17. The non-transitory computer-readable storage medium of claim 13, wherein the audio data of the piece of music comprise information indicative of a vocal track of the piece of music and information indicative of an instrumental track of the piece of music.

* * * * *